Sept. 22, 1959 M. G. KROGER 2,905,903
AUTOMATIC FREQUENCY CONTROL
Filed Oct. 1, 1953
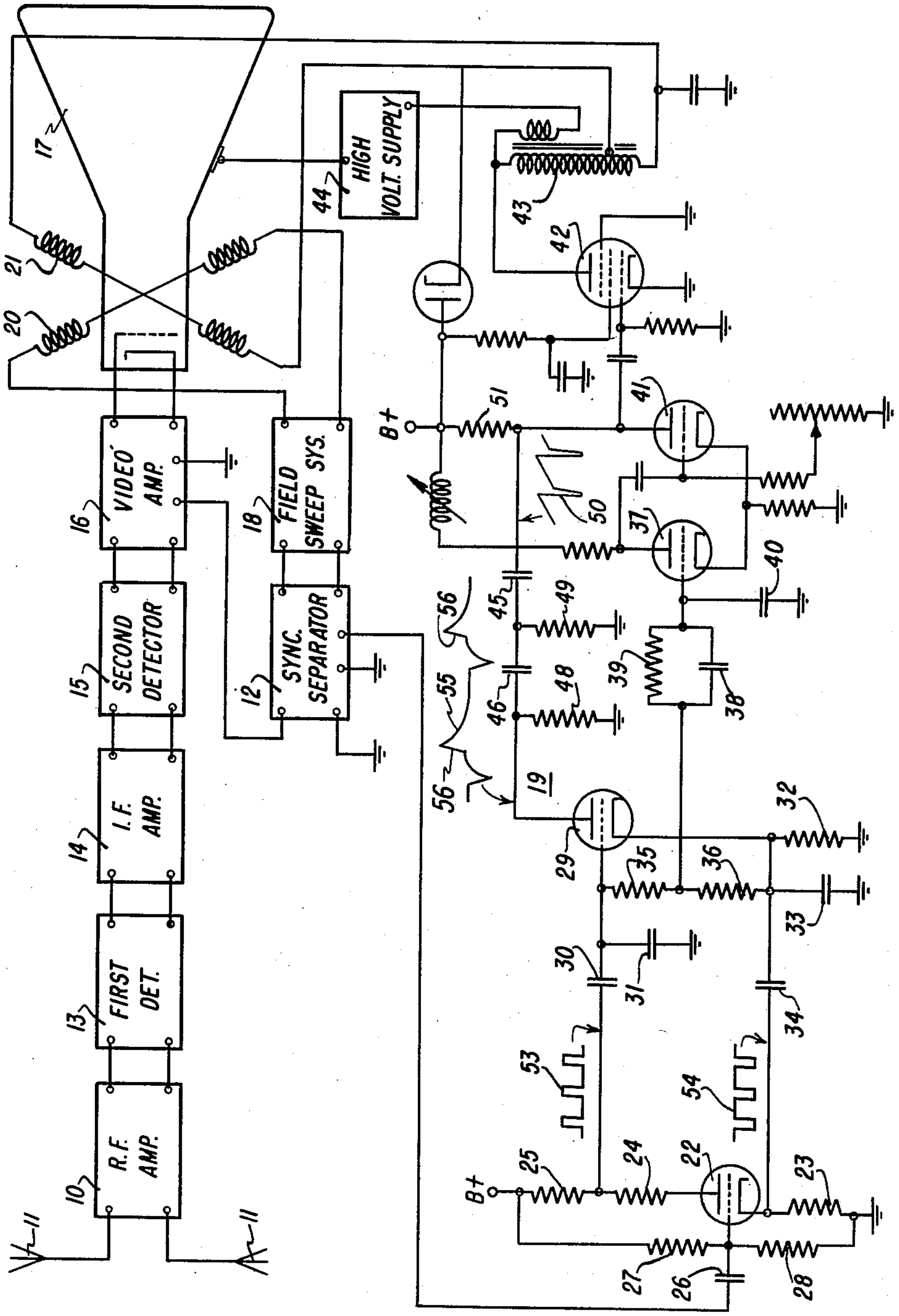
INVENTOR.
Marlin G. Kroger
BY Foorman L. Mueller
Attys.

United States Patent Office 2,905,903

Patented Sept. 22, 1959

2,905,903

AUTOMATIC FREQUENCY CONTROL

Marlin G. Kroger, Oak Park, Ill., assignor to Motorola, Inc., Chicago, Ill., a corporation of Illinois Application October 1, 1953, Serial No. 383,601

2 Claims. (Cl. 331—20)

The present invention relates to a system for synchronizing an oscillator with an incoming pulse wave and more particularly to a system for use in a television receiver for synchronizing the line sweep pulse generator with the line synchronizing pulse wave of a received television signal.

It has proven to be impractical to synchronize the line sweep generator of a television receiver directly with the incoming line synchronizing components of a television signal because any noise or other extraneous signals included in the television signal tend to produce false synchronization when direct synchronization is used, and this results in deterioration of the reproduced image. For this reason, it is usual practice to synchronize the line sweep generator with what is generally termed an automatic frequency control (AFC) synchronizing system. In the AFC systems, the incoming line synchronizing components are compared with the output signal of the line sweep generator in a phase detector to produce a control voltage that varies whenever the phase between the sweep signal and the incoming synchronizing component varies, this control voltage being used to control the frequency of the line sweep generator. Such a system is relatively unresponsive to noise and other extraneous signals and is capable of maintaining proper synchronization even in the presence of an appreciable amount of such noise.

Automatic frequency control systems for controlling the line synchronization are well known and have proved generally satisfactory. However, many prior systems of this type have proved to be unduly complicated and expensive. Application, Serial No. 242,527, filed August 18, 1951 (which has now issued into Patent No. 2,645,-717 on July 14, 1953), in the name of Albert W. Massman, entitled Synchronization Circuit, and assigned to the present assignee, discloses and claims an improved synchronizing circuit of the automatic frequency control type which is inherently simple in its construction and which operates with a high degree of efficiency. This circuit has gained wide commercial acceptance and is in general use in many types of television receivers.

In many television receivers it is most desirable that the phase relation between the line sweep generator and the line synchronizing pulse wave of the received television signal be precisely maintained between narrow limits. This is especially true in color receivers and in receivers using gated automatic gain control in which the output signal from the line sweep generator is used to gate a portion of the television signal. It is apparent that a selected phase relation between this output signal and the line synchronizing pulse wave must be rigidly maintained in such receivers in order that the desired portion of the television signal will be gated at all times during the operation of the receiver.

The present invention provides a circuit that may conveniently be incorporated into the system of the Massman application and which modifies the system to provide a synchronizing system having extremely high sensitivity to phase variations between the line pulse generator and the incoming synchronizing pulse wave to achieve a sensitive and precise control for the pulse generator.

It is accordingly an object of the present invention to provide an improved synchronizing system which is highly sensitive to phase variations and which provides an accurate and precise control for synchronizing a pulse generator with an incoming synchronizing wave.

Another object of the invention is to provide a synchronizing system for synchronizing a pulse generator with a synchronizing pulse wave in which greatly improved phase control sensitivity as compared with many prior art networks is obtained by means of an inherently simple expedient that simplifies rather than complicates the synchronizing system.

A feature of the present invention is the provision of an improved synchronizing system in which the output pulses from the generator to be synchronized are differentiated to produce a periodic differentiated pulse wave having a sharply sloped characteristic in each cycle, the differentiated pulse wave being supplied with an incoming synchronizing pulse wave to a phase detector which responds to phase variations between the synchronizing pulse wave and the sharply sloped characteristic of the differentiated pulse wave to provide a control voltage which, in turn, is used to control and synchronize the frequency of the generator.

The above and other features of the invention which are believed to be new are set forth with particularity in the appended claims. The invention itself, however, together with further objects and advantages thereof, may best be understood by reference to the following description when taken in conjunction with the accompanying drawing in which the single figure shows a television receiver which incorporates one embodiment of the improved system of the present invention.

The invention provides a system for synchronizing a pulse generator with a synchronizing pulse wave. The system includes a phase detector circuit that responds to phase variations between a pulse signal and a periodic wave having a sloping characteristic in each cycle. Means is provided for applying the synchronizing pulse wave to the phase detector circuit, and a differentiating network is coupled to the pulse generator for differentiating pulses derived from the generator to obtain a periodic differentiated pulse wave having a sharply sloping characteristic in each cycle and for applying the differentiated pulse wave to the phase detector circuit concurrently with the synchronizing pulse wave. When the pulse components of the synchronizing pulse wave occur in time coincidence with such sharply sloped characteristic of the differentiated pulse wave, the detector produces a control voltage having wide amplitude changes for slight variations in phase between the synchronizing pulse wave and the differentiated pulse wave. This control voltage is used to synchronize the frequency of the pulse generator and to maintain rigidly a certain phase relation between the generator and the synchronizing pulse wave.

The television receiver shown in the drawing includes a radio frequency amplifier 10 having input terminals connected to an antenna circuit 11 and output terminals coupled through a first detector 13 to an intermediate frequency amplifier 14. The intermediate frequency amplifier is coupled through a second detector 15 to a video amplifier 16 which, in turn, is coupled to the input electrodes of a cathode ray image reproducing device 17. Video amplifier 16 is also connected to a synchronizing signal separator 12 having output terminals connected to a field sweep system 18 and further output terminals connected to a line sweep system indicated generally by 19. The output terminals of the field and line sweep systems are connected respectively to the field deflection elements 20 and line deflection elements 21 of cathode ray image reproducing device 17.

Present-day television signals are characterized by video frequency components representing the picture information of the televised scene and by line and field synchronizing pulse waves for synchronizing the line and field sweeps of the receiver reproducing device with the television signal. The line and field synchronizing pulse waves are pedestaled to have an amplitude exceeding the maximum amplitude of the video frequency components.

When the television receiver is tuned to receive a television signal such as that described above, such signal is intercepted by the antenna circuit 11 and amplified by the radio frequency amplifier 10. The amplified signal is heterodyned to the selected intermediate frequency of the receiver in first detector 13 and the resulting intermediate frequency signal is amplified in intermediate frequency amplifier 14 and applied to the second detector 15. Detector 15 demodulates the signal and produces a composite video signal which is amplified by video amplifier 16 and applied to the input electrodes of reproducing device 17 to control the intensity of the cathode ray beam therein in accordance with the picture intelligence.

The line and field synchronizing pulse waves of the received television signal are separated from the remainder of the television signal by synchronizing signal separator 12, the field synchronizing pulse wave being used to synchronize the field sweep system 18 and the line synchronizing pulse wave being used to synchronize line sweep system 19 with the incoming television signal. The synchronization of the sweep systems with the synchronizing pulse waves causes the line and field sweeps of reproducing device 17 to be synchronized with the received television signal so that the reproducing device reproduces the picture intelligence. The sound portion of the receiver forms no part of the present invention and has not been shown.

The invention is concerned with an improved circuit for synchronizing the pulse generator in line sweep system 19 with the line synchronizing pulse wave derived from separator 12, and the line sweep system will be described in detail herein so that the invention may be clearly understood.

The line sweep system illustrated herein includes an electron discharge device 22 which functions as a phase splitter and which has a cathode connected to ground through a resistor 23 and an anode connected to the positive terminal B+ through a pair of series-connected resistors 24, 25. The synchronizing signal separator 12 has an output terminal coupled to the control electrode of device 22 through a coupling capacitor 26 and the control electrode is connected to the common junction of a pair of resistors 27, 28 which are connected as a potentiometer between B+ and ground.

The common junction of resistors 24 and 25 is coupled to the control electrode of a phase detector triode electron discharge device 29 through a capacitor 30, the control electrode being coupled to ground through a capacitor 31. The cathode of device 29 is connected to ground through a resistor 32 shunted by a capacitor 33, and the cathode is coupled to the cathode of device 22 through a coupling capacitor 34. The control electrode of device 29 is connected to the cathode through a pair of series-connected resistors 35 and 36.

The common junction of resistors 35 and 36 is coupled to the control electrode of an electron discharge device 37 through a filter network; the filter network including a capacitor 38 shunted by a resistor 39 and also including a capacitor 40 coupling the last-mentioned control electrode to ground. Device 37 and a further electron discharge device 41 are connected in well-known manner as a multi-vibrator which, in the present instance, constitutes a pulse generator whose frequency is to be synchronized with the line synchronizing pulse wave of the received television signal derived from separator 12.

The anode of device 41 is coupled to ground through a discharge circuit including a capacitor 45 and peaking resistor 49. The junction of the anode of device 41 and the discharge circuit 45, 49 is coupled to a control electrode of an electron discharge device 42. Device 42 is connected in well known manner as an output amplifier stage and is coupled to the line deflection elements 21 of reproducing device 17 through a known coupling arrangement including a transformer 43. The output stage is also coupled to a high voltage supply 44 which, in turn, is connected to the accelerating electrode of reproducing device 17 to provide the desired accelerating voltage for that electrode.

The pulse generator 37, 41 produces a peaked sawtooth wave 50 across the discharge circuit 45, 49, capacitor 45 being discharged by conduction of device 41. During cutoff of device 41, capacitor 45 charges through resistor 51. Sawtooth wave 50 is amplified by device 42 and applied to the line deflection elements 21 in known manner. Negative pulses of substantially square wave form and at the line deflection frequency appear across peaking resistor 49 and these pulses are differentiated in a differentiating network to produce a differentiated pulse wave 55 having a sharply sloped positive-going characteristic 56 during each cycle of the wave. This differentiating network comprises a capacitor 46 coupling the junction of capacitor 45 and resistor 49 to the anode of device 29, and also comprises a resistor 48 connecting the anode to a point of reference potential or ground.

The sharply sloped positive-going characteristic of the differentiated pulse wave is, in this instance, the positive-going back edge of each differentiated pulse component of the wave. This back edge occurs at the proper times during the line retrace intervals to establish a desired phase relation between the line synchronizing pulse wave and the line pulse generator. Moreover, this edge has an extremely sharp rise time which is considerably sharper than the integrated pulse wave used in many systems of this general type. When the differentiated pulse wave is compared with the line synchronizing pulse wave in the phase detector, slight phase differences between the two produce large variations in the control voltage produced by the phase detector so that a desired phase relation may be rigidly maintained.

Referring again to the drawing for a more detailed description of the operation of the system, synchronizing signal separator 12 supplies the line synchronizing pulse wave of the received television signal with negative-going polarity to the control electrode of device 22 through capacitor 26. As previously mentioned, device 22 functions as a phase splitter, and this device supplies the line synchronizing pulse wave with positive-going polarity to the control electrode of device 29 and with negative-going polarity to the cathode of device 29. These latter pulse waves are indicated respectively as 53 and 54.

As more fully described in the Massman patent referred to previously herein, the pulse waves 53 and 54 establish an operating bias in device 29 that is such that the potential of the common junction of resistors 35 and 36 varies in a positive or negative direction with respect to reference or ground potential by an amount determined by the phase relation between the pulse waves and a periodic signal applied to the anode of device 29; the periodic signal having a sloping characteristic during each cycle along which the pulse components of waves 53 and 54 in effect "ride" to produce a control voltage at the junction of resistors 35 and 36 that varies with phase changes between the periodic signal and the pulse waves. Resistors 35 and 36 are of equal value so that noise signals, which are applied with opposite polarity to the ends of the resistors by phase splitter 22, cancel at the common junction of these resistors. The control voltage appearing at the common junction is filtered by network 38, 39, 40 and applied to the pulse generator 37, 41 to control the frequency of the generator and synchronize it with the line synchronizing pulse wave.

In accordance with the present invention, the periodic signal applied to the anode of device 29 is the differentiated pulse wave 55 from the differentiating network 46, 48. The negative-going peaks of the differentiated pulses of this wave have no effect on the phase detector circuit of device 29 since they merely drive the anode from a zero potential condition where there is no anode current flow to a negative potential condition where there is likewise no current flow. However, the sharply sloped back edges of the differentiated pulses drive the anode positive producing anode current flow and the aforementioned control voltage at the common junction of resistors 35 and 36. Due to the extreme sharpness of these back edges, any slight variation in phase between the line synchronizing pulse wave and the differentiated pulse wave produces a relatively large variation in the control voltage so that a predetermined phase relation between pulse generator 37, 41 and the synchronizing pulse wave can be rigidly maintained.

The synchronizing system of the present invention may incorporate other types of phase detector circuits apart from the one specifically illustrated herein. That is, any known type of phase detector may be used that produces a control voltage indicative of phase variations between a pulse wave and a periodic signal having a sloping characteristic in each cycle. It has been found that greatest sensitivity is obtained when the triode type phase detectors, such as that illustrated herein, are used. This results from the fact that such detectors respond only to the sharp positive-going back edges of the differentiated pulses and are not sensitive to the entire slope of such pulses from the negative to the positive peaks thereof.

In a constructed embodiment of the invention, the following circuit parameters were used and these are listed herein merely by way of example.

| | | |
|---|---|---|
| Capacitor 30 | micromicrofarads | 470 |
| Capacitor 31 | microfarads | .001 |
| Capacitor 34 | micromicrofarads | 470 |
| Capacitor 33 | microfarads | .001 |
| Resistor 35 | ohms | 100,000 |
| Resistor 36 | do | 100,000 |
| Resistor 32 | do | 100,000 |
| Resistor 48 | do | 5,600 |
| Capacitor 46 | micromicrofarads | 220 |
| Resistor 49 | ohms | 4,700 |
| Capacitor 45 | micromicrofarads | 680 |
| Resistor 39 | megohms | 4.7 |
| Capacitor 38 | micromicrofarads | 3,300 |
| Capacitor 40 | microfarads | .01 |

Discharge device 22—½ 6SN7
Discharge device 37, 41—6SN7

While a particular embodiment of the invention has been shown and described, modifications may be made and it is intended in the appended claims to cover all such modifications as fall within the true spirit and scope of the invention.

I claim:

1. In a television receiver which includes apparatus for deriving synchronizing pulse signals from a received wave and a line scanning signal generator operating at line frequency and including an oscillator producing sawtooth signals at the line frequency; a system for synchronizing the sawtooth signals with the synchronizing pulse signals, including in combination, a phase detector circuit including an electron discharge device having input and output electrodes, means for applying the synchronizing pulse signals to the input electrodes of said discharge device with a polarity tending to cause conduction thereof, the line scanning signal generator having circuit means including resistor-capacitor elements for converting the sawtooth signals into substantially square wave pulse signals having front and back edges, a differentiating network coupled to said circuit means of the line scanning generator for differentiating the square wave pulse signals to produce a periodic differentiated peak pulse having a sharply sloping characteristic in each cycle corresponding to the back edge of each square wave pulse signal, means for applying the periodic differentiated peak pulse to said output electrode of said electron discharge device with a polarity tending to cause conduction thereof the differentiated peak pulse and the synchronizing pulse signals being so timed that individual synchronizing pulse signals of the latter effectively ride on the sharply sloping characteristic of the former effectively to provide a composite signal for said discharge device having a peak amplitude varying in accordance with phase variations between the sloping characteristic of each cycle of the differentiated peak pulse and the synchronizing pulse signal, circuit means included in said phase detector and responsive to variations in such peak amplitude to produce a control voltage varying in accordance with the aforesaid phase variations, and means for utilizing the control voltage to synchronize the sawtooth signals of the oscillator with the synchronizing pulse signals.

2. In a television receiver which includes apparatus for deriving synchronizing pulse signals from a received wave, and a line scanning signal generator operating at line frequency and including an output stage and an oscillator producing sawtooth signals at the line frequency; a system for synchronizing the sawtooth signals with the synchronizing pulse signals including in combination, a phase detector circuit including a triode electron discharge device having an anode, a cathode, and a control electrode; means for applying the synchronizing pulse signals to said control electrode and cathode of said discharge device with a positive going wave being applied to said control electrode and a negative going wave being applied to the cathode; a resistor-capacitor network in the oscillator having a point therein at which appears substantially square wave pulses at the line frequency and having front and back edges; a differentiating network coupled between the point of the resistor-capacitor network and said anode of said electron discharge device, said differentiating network having constants selected for differentiating the square wave pulses to apply to said anode periodic differentiated peak pulses having a positive-going sharply sloping characteristic in each cycle corresponding to the back edges of the square wave pulses, the peak pulses and thte synchronizing pulse signals being so timed that individual synchronizing pulses of the latter effectively ride on the sharply sloping characteristics of the former effectively to provide a composite signal having a peak amplitude varying in accordance with phase variations between the sloping characteristics of each cycle of the differentiated peak pulses and the synchronizing pulse signals; resistor means connected between said control electrode and cathode and responsive to variations in such peak amplitude to produce a control voltage varying in accordance with the aforesaid phase variations; and means for utilizing the control voltage to synchronize the sawtooth signals of the oscillator with the synchronizing pulse signals.

References Cited in the file of this patent

UNITED STATES PATENTS

| | | |
|---|---|---|
| 2,332,681 | Wendt | Oct. 26, 1943 |
| 2,459,699 | Hallmark | Jan. 18, 1949 |
| 2,503,700 | Barco | Apr. 11, 1950 |
| 2,564,588 | Wendt | Aug. 14, 1951 |
| 2,566,762 | English | Sept. 4, 1951 |
| 2,632,050 | Parker | Mar. 17, 1953 |
| 2,645,717 | Massman | July 14, 1953 |